United States Patent [19]

Mikheev et al.

[11] 3,723,612

[45] Mar. 27, 1973

[54] STABILIZER FOR RADIOACTIVE COLLOIDAL SOLUTIONS

[75] Inventors: Nikolai Borisovich Mikheev; Maia Arkadievna Gracheva, both of Moscow; Ljubov Grigorievna Bogomolova, Leningrad; Valentin Ilich Levin, Moscow, all of U.S.S.R.

[73] Assignee: Institut Biofiziki, Moscow, U.S.S.R.

[22] Filed: Aug. 8, 1969

[21] Appl. No.: 848,714

[52] U.S. Cl...........424/1, 252/301.1 R, 252/301.1 S, 424/360
[51] Int. Cl. ..............................................A61k 27/04
[58] Field of Search ..260/117, 118; 424/1, 359, 360; 252/301.1 R, 301.1 S, 340, 316

[56] References Cited

UNITED STATES PATENTS 3,127,313   3/1964   Glenn..................................424/1 X

OTHER PUBLICATIONS

Bellion et al., Nuclear Science Abstracts, Vol. 21, No. 14, July 31, 1967 item 24345, pp. 2571–2572.

*Primary Examiner*—Benjamin R. Padgett
*Attorney*—Waters, Roditi, Schwartz & Nissen

[57] ABSTRACT

A stabilizer for radioactive colloidal solutions prepared from three gelatin fractions of varying molecular weights. It is prepared by heating the fractions with water, sodium chloride and succinic anhydride followed by neutralization and bacterial filtration.

7 Claims, No Drawings

STABILIZER FOR RADIOACTIVE COLLOIDAL SOLUTIONS

The present invention relates to stabilizers of disperse systems and, more particularly, to stabilizers of colloidal solutions employed in medicine and also in the oil producing and metal-working industries.

It is known to use gelatin as a stabilizer for colloidal solutions.

A disadvantage of employing gelatin as a stabilizer for colloidal solutions used in medicine is that gelatin causes a pyrogenic reaction when introduced into the body parenterally. A disadvantage of employing gelatin as a stabilizer for radioactive colloidal solutions is that gelatin is decomposed by radioactive radiation, thus leading to coagulation of said colloidal solutions.

It is the primary object of the present invention to provide a new stabilizer insuring the stability of radioactive colloidal solutions.

Another object is to provide a stabilizer of colloidal solutions which is suitable for introduction into the body and which withstands heat sterilization.

Other objects and features of advantage of the invention will be explained in the ensuing description.

In accordance with the foregoing and other objects the invention consists essentially in the provision of a stabilizer for colloidal solutions which, according to the invention, is modified gelatin comprising fractions having the following molecular weights: 20,000 − 23−27 wt. percent; 10,000 − 45−55 wt. percent; and less than 10,000 − the remainder. The gelatin may be, for example, skin or bone gelatin as set forth in U.S. Pat. No. 3,127,313 of Mar. 31, 1964.

Said modified gelatin is prepared by the action of water, at a gauge pressure of 1.1–1.3 atm and a temperature of 125°–135°C, on a mixture consisting of gelatin, sodium chloride and succinic anhydride, followed by neutralization of the solution obtained and bacterial filtration of the same. We have tentatively named such modified gelatine "gelatinol."

A stabilizer freed of calcium and magnesium ions is preferably employed.

The present stabilizer can be used for colloidal solutions prepared by the condensation method and the reduction method.

The present stabilizer can be used in combination with other stabilizers, preferably with saccharides.

In addition, the present stabilizer is used for preparing medical and radioactive colloidal solutions.

The method of preparing a colloidal solution by condensation comprises adding gelatinol to the solutions of salts to be reacted to form the colloidal solution, after which said solutions of salts are mixed.

The method of preparing a colloidal solution by reduction of the salt of a noble metal comprises adding gelatinol to a solution of said salt after which said salt is reduced.

It will be understood that the methods of preparing colloidal solutions described above are only two of the many possible variations of the use of gelatinol as a stabilizer of colloidal solutions. Gelatinol can also be used alone or in combination with other stabilizers for the preparation of colloidal systems by other methods, for example, by the dispersion method, wherein the precipitate to be converted into the colloidal state is dispersed in the presence of gelatinol. Inasmuch as gelatinol withstands a radiation load of not less than 1.5 millions rads, colloidal solutions stabilized with gelatinol are stable to radiation while in storage. In addition, gelatinol withstands sterilization by autoclaving, and therefore colloidal solutions stabilized with gelatinol can be subjected to heat sterilization. Besides, colloidal solutions stabilized with gelatinol are suitable for medical use by injection. In some cases the use of gelatinol in combination with other stabilizers makes it possible to increase the stability of colloidal solutions.

The present invention is illustrated in the following examples.

EXAMPLE 1.

Preparation of colloidal solution of chromium phosphate with $P^{32}$ by the condensation method.

3 ml of a solution of chrome alum having a chromium content of 6.75 g per liter is mixed with 30 ml of gelatinol which has been freed of calcium and magnesium ions and which contains fractions having the following molecular weights: 20,000 − 24 wt. percent; 10,000 − 45 wt. percent; less than 10,000 − 31 wt. percent; said gelatinol being diluted with water in the proportion of 1:7. The solution is heated to boiling and to it is added 14 ml of a solution of sodium hydrophosphate, radioactive from $P^{32}$ and containing 6 mg of phosphorus, and 1.8 ml of the above gelatinol but not diluted with water. The pH of the mixture is adjusted to 8.5 by the addition of sodium hydroxide. The colloidal solution is passed through an ion-exchange column charged with an anion exchanger, for example, Dowex 2, to remove sulfate ion and unreacted phosphate ion. The product solution is packaged and subjected to fractional sterilization. The preparation contains not more than 2 percent phosphorus in the ionized state and is stable in storage not less than 1 month.

EXAMPLE 2.

Preparation of colloidal solution of zirconyl phosphate with $P^{32}$ by the condensation method.

To 5 ml of a solution of zirconyl chloride containing 60 ml of zirconium per ml is added 10 ml of 1 N hydrochloric acid and 2 ml of a solution of yttrium chloride containing 10 mg of yttrium per ml and the volume made up to 100 ml with a solution of gelatinol which has been freed of calcium and magnesium ions and which contains fractions having the following molecular weights: 20,000 − 27 wt. percent; 10,000 − 55 wt. percent; less than 10,000 − 18 wt percent; said gelatinol being diluted with distilled water in the proportion of 1:6. A solution of radioactive sodium hydrophosphate with the above gelatinol but not diluted with water is prepared separately. To 10 ml of sodium hydrophosphate containing 5 mg of phosphorus per ml is added a solution of radioactive sodium hydrophosphate containing $P^{32}$, and also 12 ml of gelatinol and the volume is made up to 70 ml with water. The pH of the solution is adjusted to 2.2 with hydrochloric acid, after which the volume is increased to 100 ml with water. To the solution of zirconyl chloride is then added with stirring the above solution of sodium hydrophosphate, upon which there is formed an acid colloidal solution of zirconyl phosphate containing $P^{32}$. This solution is freed of ionized phosphorus by treatment with anion-exchange aluminum oxide. The finished preparation is packaged and fractionally sterilized. The ionized phosphorus content in the preparation does not exceed 1 percent of the total phosphorus content. The preparation is stable in storage for not less than 1 month. Before making injections the acid colloidal zirconyl phosphate is neutralized.

EXAMPLE 3.

Preparation of colloidal solution of palladium containing $Pd^{103}$ by the reduction method.

In an Erlenmeyer flask are placed 2 ml of 10 percent ascorbic acid, 2 ml of 0.5 N sodium hydroxide, 9 ml of twice-distilled water and 0.5 ml of gelatinol of the composition specified in Example 1. The contents of the flask are heated on the water bath for 3 min and to the mixture is added 0.5 ml of inactive palladium in 0.075 N hydrochloric acid containing 0.5 mg of palladium per ml. The mixture is heated on the water bath for 5 minutes, after which there is added 1.5 ml of the above gelatinol and heating continued for another 5 minutes. To the hot "seeding" solution thus prepared there is added dropwise with stirring 9.5 ml of a palladium solution having a concentration of 0.5 mg Pd/ml in 0.075 N hydrochloric acid and containing $Pd^{103}$. The flask is then heated on the water bath for 10 minutes and neutralized with 0.5 N sodium hydroxide to pH 5. The product solution is sterilized in the autoclave at a gauge pressure of 1 atm for 20 minutes.

EXAMPLE 4.

Preparation of a colloidal solution of tin hydroxide tagged with technetium$^{99}$, using a combined stabilizer.

To 2 ml of isotonic sodium chloride solution containing $Tc^{99}$ in the form of pertechnetate is added 0.15 ml of 1.2 percent stannic chloride solution in a mixture of ethyl alcohol and 5 N hydrochloric acid in the proportion of 2:1 by volume. To the solution obtained is added 1 ml of gelatinol containing fractions with the following molecular weights: 20,000 −25 wt. percent; 10,000 − 50 wt. percent; less than 10,000 − 25 wt. percent; and 1 ml of 40 percent glucose solution as a stabilizer. The mixture is stirred and allowed to stand for 30 minutes. The solution is then neutralized to pH 4.5 by the addition of 0.1 ml of a solution containing 4 g of sodium hydroxide and 25 g of sodium acetate in 100 ml.

To prepare the colloidal solution in a sterile form the finished preparation can be sterilized by bacterial filtration. A colloidal solution of tin containing $Tc^{99}$ is suitable for diagnosing diseases of the liver and bone marrow.

To prepare gelatinol a mixture consisting of 8 wt. percent of gelatin, 0.9 wt. percent of sodium chloride, 0.2 wt.% of succinic anhydride and 90.9 wt. percent of water is heated in an autoclave at a gauge pressure of 1.2 atm for 30 minutes. After cooling, autoclaving is repeated in the same conditions. The preparation is then neutralized to pH 6.8–7 with sodium bicarbonate and sterilized by bacterial filtration.

In the above examples of the preparation of colloidal solutions the gelatinol used contained fractions with the following molecular weights:
1. 20,000 − 24 wt. percent; 10,000 − 45 wt. percent; less than 10,000 − 31 wt. percent;
2. 20,000 − 27 wt. percent; 10,000 − 55 wt. percent; less than 10,000 − 18 wt. percent;
3. 20,000 − 25 wt. percent; 10,000 − 50 wt. percent; less than 10,000 − 25 wt. percent.

The properties of the colloidal solutions obtained in Examples 1 through 4 do not depend on the fractional content of the gelatinol.

We claim:

1. A method of making a stabilizer for colloidal solutions comprising mixing gelatin containing fractions with the following molecular weights: 20,000 − 23–27 wt. percent; 10,000 − 45–55 wt. percent, and less than 10,000 the remainder with water, at a gauge pressure of about 1.1–1.3 atm and a temperature of about 125°–13 5°C, and with sodium chloride and succinic anhydride, followed by neutralization of the solution thus obtained and by a bacterial filtration of said solution.

2. A method of making a stabilizer as claimed in claim 1 comprising freeing the solution of calcium and magnesium ions.

3. A method of making a stabilizer as claimed in claim 1 comprising combining the thusly obtained stabilizer with other stabilizers.

4. A method of making a stabilizer as claimed in claim 1, comprising combining the thusly obtained stabilizer with saccharides.

5. The stabilizer prepared according to the method claimed in claim 1.

6. The stabilizer claimed in claim 5 combined with a colloidal solution prepared by the condensation or reduction methods.

7. The stabilizer claimed in claim 5 combined with medical or radioactive colloidal solutions.

* * * * *